April 6, 1954    F. SCHNEIDER    2,674,339
APPARATUS FOR THE DESTRUCTION OF
AIR CONTAMINANTS BY COMBUSTION
Filed April 26, 1951
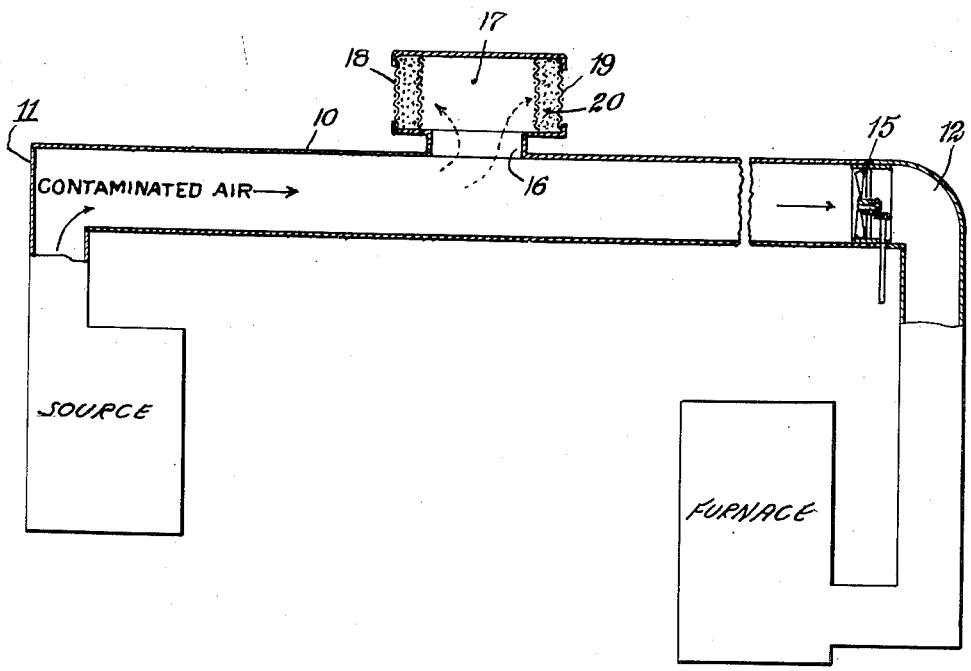
INVENTOR.
Frank Schneider
BY
Attorneys Patented Apr. 6, 1954

2,674,339

UNITED STATES PATENT OFFICE 2,674,339

APPARATUS FOR THE DESTRUCTION OF AIR CONTAMINANTS BY COMBUSTION

Frank Schneider, Douglaston, N. Y.

Application April 26, 1951, Serial No. 222,997

2 Claims. (Cl. 183—6)

This invention relates to a disposal of air contaminants in industrial processes. It has long been recognized that the destruction of obnoxious substances carried by an air stream is a problem in commercial industries and it has likewise been recognized that certain types of obnoxious substances can best be eliminated by high temperature oxidation, that is, by combustion.

The National Bureau of Standards has stated (Circular 491, p. 2), "The surest method of disposal of the odor in the foul air is to pass the air through a flame. If the air can be used as primary air (mixed in advance of combustion with the fuel) with gas or oil in a boiler or furnace, organic odors are destroyed completely and without difficulty.... It is ordinarily too expensive to supply fuel for this purpose only...."

As the Bureau points out, in many industries the volume of obnoxious air is so large that the cost of heating that quantity of air to the temperature necessary for combustion is prohibitive, because combustion of this type of material usually requires temperatures in excess of 2000° F. Its use for destroying the relatively low concentration in a large volume of air renders the process too expensive. A report of the Industrial Hygiene Foundation states, "Organic malodors may be destroyed by burning, a procedure which will usually be feasible only where there is a nearby furnace operating for another productive purpose, that is, power or process. The combustion air requirements of the furnace in relation to the volume and oxygen content of the gas mixtures to be burned is another obvious limiting factor." A report from the Dow Chemical Company engineers states, "In the case of a synthetic rubber plant it was deemed cheaper (than other control methods) to vent the entire building and process vents to a system which delivered the air to the force draft fans of a nearby power plant. The system has proved very effective."

This method is satisfactory where the volume of obnoxious contaminated air is constant and not above the requirements of the furnace or heating system. However, where the volume of contaminated air is not constant or where it varies from a point above to a point below the requirements of the furnace, it is not practical. Where the volume of contaminated air is larger than the primary requirements of the furnace, all of the air will not be purified or the excess air will lower the temperature of the combustion zone to the point where the unit is inefficient and costly to maintain.

For example, in the antibiotic products industry in the preparation of penicillin and the like, the fermentation mixtures in large vessels is continuously aerated. This air picks up a distinctly unpleasant odor in its passage through the fermentation mixture. The volume of air from the fermentors is usually too large to be completely utilized by the boiler or furnace of the plant. The content of combustible matter is too low to permit economic incineration. In the event of a shut down of several of the digestors (as required for cleaning, etc.) the volume of air drops. Thus there is a continually varying volume of exhaust which requires decontamination. In another example, in the paper and pulp industry, the wood is reacted with chemicals in a digester at high temperature. This results in the formation of steam and gases such as mercaptans which have a foul odor. To remove the digested wood a valve is opened and the liquid, solid and gaseous contents "blow" out. These gases constitute the atmospheric pollution problem of all pulp mills. The gases from the "blow" escape first at a rate of about 10,000 cubic feet per minute but as the flow progresses the volume decreases to a few hundred cubic feet per minute. The total time of blow is about 10 minutes. The gases can be incinerated but the rate of 10,000 C. F. M. is too high for the furnaces used at the mills. Again, the variation in quantity of contaminated air above and below the furnace requirements makes it impossible to use the furnace as the sole means of disposal of contaminants.

If a furnace is constructed to incinerate the contaminated air (so-called fume-destructors) it would have to be large enough to accommodate the "maximum" volume of contaminated air, whether or not that maximum volume were supplied to it or not. The cost of such fume incineration is also very high. A recent installation in a fish dehydrating plant which had only 900 C. F. M. to dispose of cost about $1400 per year for fuel alone. In installations such as the antibiotic plants, the volume of contaminated air is of the order of 30,000 C. F. M. and the cost of the original equipment and the cost of operation are more than proportionately higher.

In the subsequent discussion the term "furnace" is intended to mean a furnace used for another productive purpose such as power or process, although if a fume burner or destructor is available my invention can be used in conjunction with it as well as in conjunction with a production furnace.

An object of my invention, therefore, is to provide a means to reduce the volume of contaminated air to any given quantity which can be readily accommodated by the furnace, thus destroying the maximum quantity of the contaminants and at the same time preventing enough of the contaminants from reaching the atmosphere to create a nuisance.

Another object of the invention is to provide a flexible structure whereby the furnace or other heating unit will use as much of the contaminated air as it can efficiently accommodate and at the same time have available means for disposing of the surplus and means for supplying additional uncontaminated air when necessary to meet the primary needs of the heating unit.

One advantage of my system is that I provide such a structure which is sufficiently flexible so as to preclude the need for valves, test gauges and other equipment, all of which are very expensive and subject to deterioration when subjected to certain contaminants.

It is, of course, known that obnoxious contaminants may be removed from gas or air streams by means of well known decontaminating agents, such as activated carbon or silica jell, or, in some instances, by electric precipitation. All of these systems as presently used, however, are more or less expensive and require periodic shutdowns to reactivate or replace the decontaminating agent, thus interfering with the general operation of the plant in question.

Other objects and advantages will appear from the accompanying drawing in which the single figure represents diagrammatically a simplified piece of equipment to carry out my invention.

In the form shown, which is intended to be merely illustrative of my invention, I provide a duct 10 leading at one end 11 to the source of contaminated air and at the other end 12 to the furnace or other heating unit. Mounted either in the duct or in the furnace, itself, is a fan or blower 15, which is fitted with the usual control devices which operate to provide the furnace with the amount of air most suited to its efficient operation.

In the duct 10 is an opening 16 leading to a chamber 17. In the form shown I have provided on either side of the chamber 17 screens 18 and 19 provided with a bed 20 of activated carbon or other suitable decontaminant. This chamber may be circular or any other suitable shape to best accomplish its purpose. Three possible conditions may obtain: 1. Just enough contaminated air is emitted through 11 to supply the air requirements of the furnace. 2. The quantity of contaminated air is in excess of the air requirements of the furnace. 3. The quantity of contaminated air is below the air requirements of the furnace. In case 1, the air will be drawn directly into the furnace and the contaminant destroyed by combustion. In case 2 the fan on the furnace will draw in the required amount and the excess will be allowed to pass through the screens in chamber 17. The decontaminating screens must be of a size to accommodate any expected or possible excess quantity of contaminated air. In case 3 the fan will draw in as much contaminated air as is available and will draw in the balance of the required quantity from outside air through the screens 18 and 19. Since the back pressure of these screens is of the order of a fraction of an inch and the draft of furnace fans is more than several inches (usually from 5 to 12 inches) there is no difficulty in drawing in the make-up air. Purely by way of comparison let us assume that the air consumption of the furnace is 10,000 C. F. M., then, in that case, the blower 15 would be designed to deliver to the furnace 10,000 C. F. M. Assuming that the flow of contaminated air ranges from 15,000 C. F. M. to 8,000 C. F. M., depending upon the number of units of the plant in operation, the chamber 17 and its decontaminating screens must be large enough to provide for the decontamination of 5,000 C. F. M. and to allow the intake of at least 2,000 C. F. M., thus making it sure that at all times the flow of contaminated air into the end 11 of the duct 10 is in no way impeded, but at the same time making sure that the 10,000 C. F. M. needed for the efficient operation of the furnace is available.

In operation the contaminated air is drawn or forced from its source into the duct 10, and the predetermined amount passes through the blowers 15 to the furnace. Excess contaminated air flows into the chamber 17 and is decontaminated by the filters 18 and 19, or, if the supply of contaminated air is not sufficient, fresh air is drawn from the atmosphere in sufficient volume to make up the volume required by the furnace. The filters thus act like a semi-permeable filter, permitting the flow of air in either direction while at the same time preventing the obnoxious materials from reaching the outside air.

This system produces a maximum combustion of obnoxious material in the contaminated air while at the same time providing for the most efficient operation of the heating unit.

I claim:

1. In combination with a furnace having defined air requirements, a device for disposing of contaminated air comprising a duct, said duct leading from a source of contaminated air to said furnace, a blower in said duct having a predetermined capacity equal to the requirements of said furnace, an opening in said duct positioned between said source of contaminated air and said blower and a filter associated with said opening in such a manner that said filter will operate as an inlet-outlet filter whereby fresh air may be introduced should the amount of air in the duct be less than the capacity of said blower and whereby contaminated air may be cleaned should the pressure in the duct be above the capacity of the blower the intake or outtake of said filter being governed by the pressure within said duct.

2. A device for disposing of contaminated air by consuming it in a furnace comprising a duct, said duct leading from a source of contaminated air to the furnace, a blower in said duct having a pre-determined capacity equal to the requirements of said furnace, an opening in said duct positioned between the source of contaminated air and said blower, a filter connected with said opening in such a manner that the direction of flow through said filter will be automatically governed by the pressure within the duct so that air is admitted when the pressure within the duct is below that of the requirements of said furnace and air is allowed to escape through said filter when the pressure in the duct is above and beyond the requirements of said furnace.

References Cited in the file of this patent

UNITED STATES PATENTS

| Number | Name | Date |
| --- | --- | --- |
| 519,325 | Davids | May 8, 1894 |
| 889,228 | Harrington | June 2, 1908 |
| 1,896,910 | Merkt | Feb. 7, 1933 |
| 1,925,303 | Church | Sept. 5, 1933 |
| 2,084,167 | Stilson | June 15, 1937 |
| 2,114,761 | Crider | Apr. 19, 1938 |
| 2,164,954 | Stephens | July 4, 1939 |
| 2,177,258 | Jares | Oct. 24, 1939 |
| 2,439,793 | Braddon | Apr. 20, 1948 |